United States Patent Office 2,960,912
Patented Nov. 22, 1960

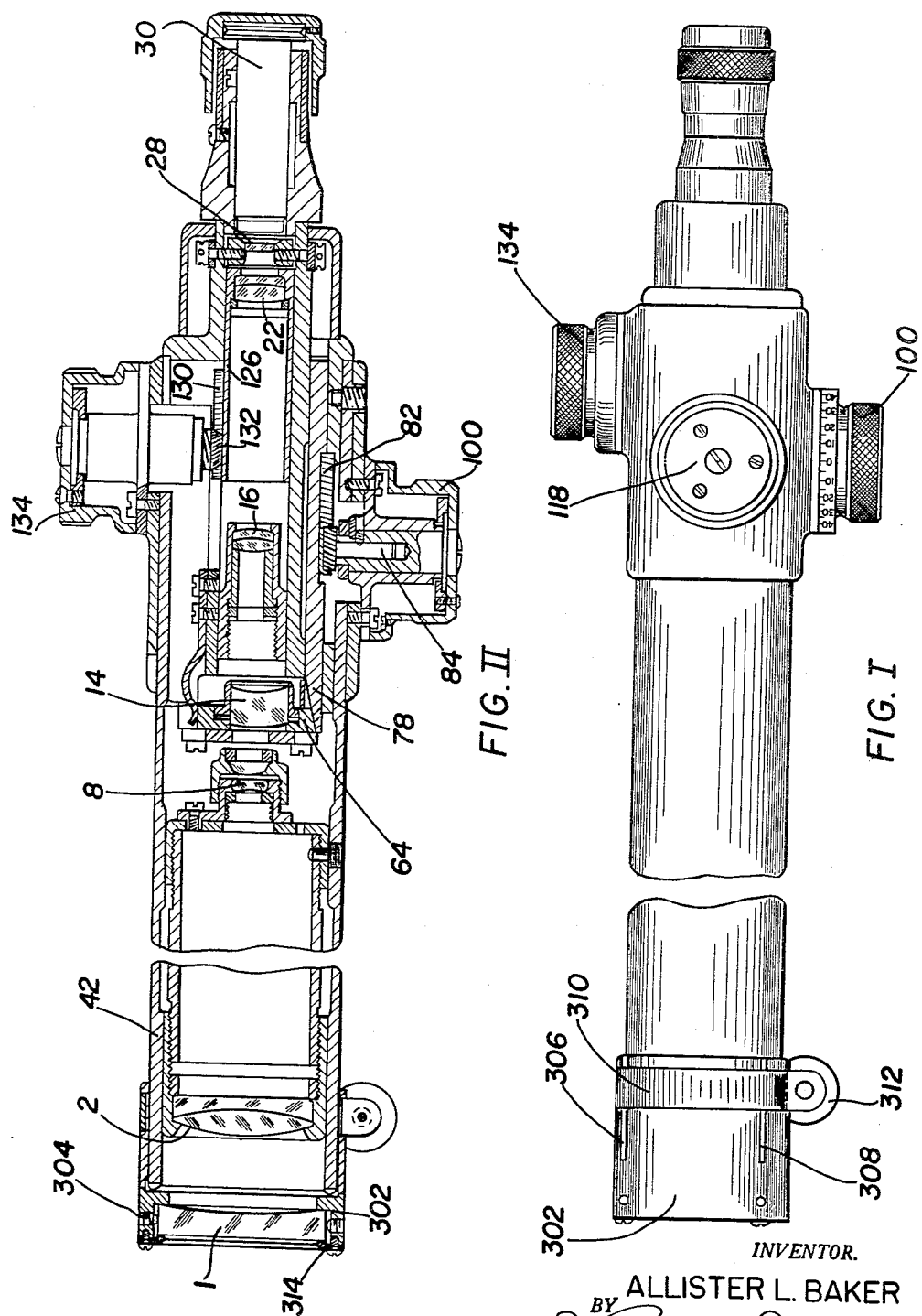

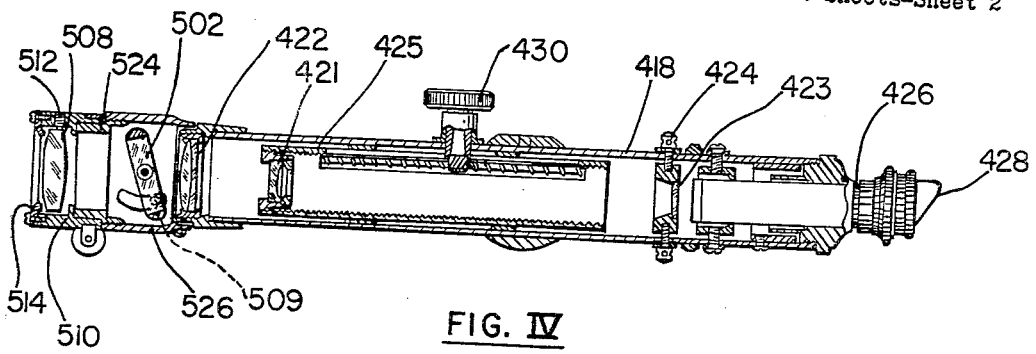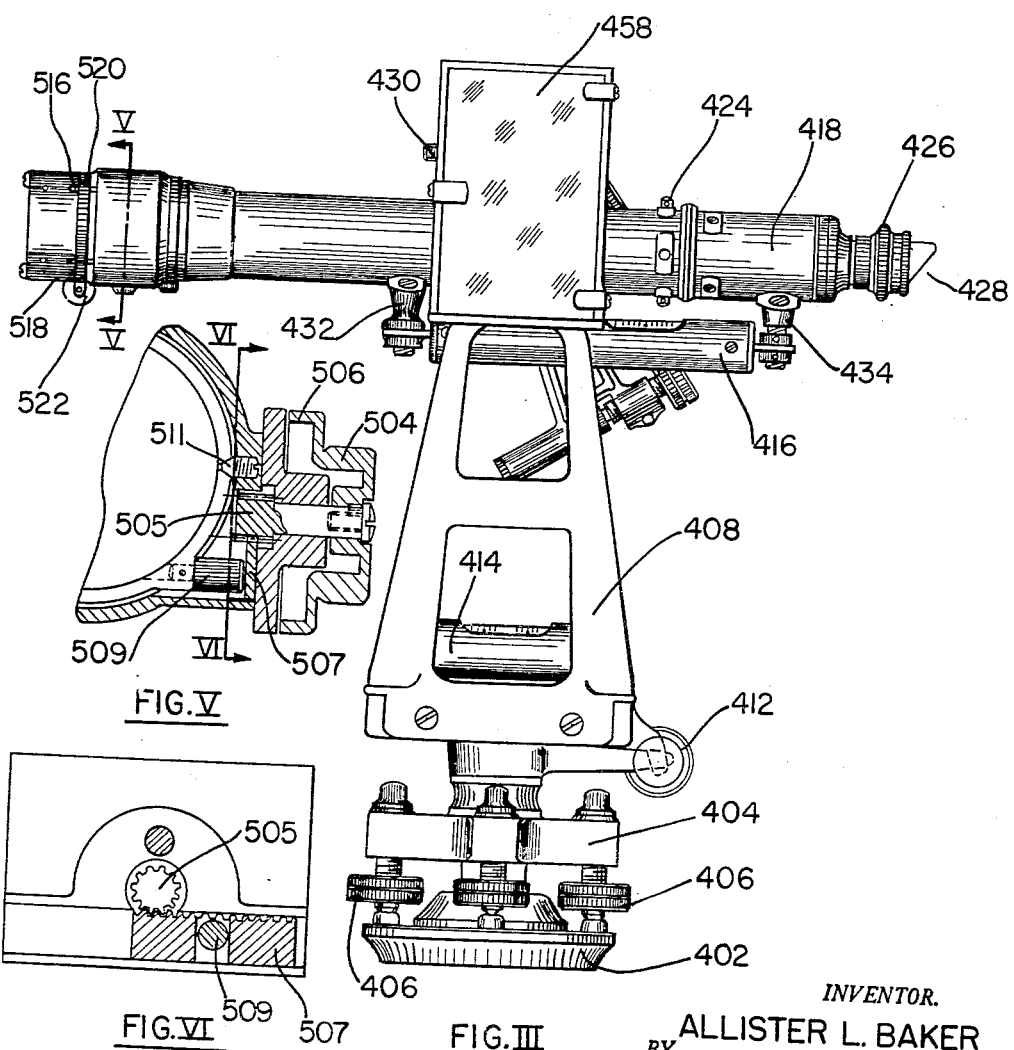

2,960,912

ALIGNMENT TELESCOPE WITH LENS ARRANGEMENT FOR INFINITY FOCUS ADJUSTMENT

Allister L. Baker, Denville, N.J., assignor to Keuffel & Esser Company, Hoboken, N.J., a corporation of New Jersey Filed Apr. 29, 1957, Ser. No. 655,768

4 Claims. (Cl. 88—32)

This invention relates to a telescope useful in optical tooling for measuring small angular deviations. One important aspect of the invention is an attachment which can be applied to existing optical tooling alignment telescopes for converting their micrometers which are normally used for measuring displacements into means for measuring small angular deviations. For example, according to the present invention an attachment may be applied to an alignment telescope of the type shown in Patent #2,784,641 which issued on March 12, 1957 to Carl W. Keuffel et al. This attachment will make the telescope useful for measuring small angular deviations instead of the small displacements which the telescope (as described in the patent) is intended to measure.

The invention is not limited to attachments for use on existing telescopes, however. According to another aspect of the invention, a telescope is provided which is intended only for the measurement of small angular deviations.

Patent #2,784,641 teaches that an optical displacement lens can be made to displace the line of sight of a telescope by shifting it laterally across the telescope axis. It is also known in the art that the line of sight of a telescope may be displaced by tilting a plano parallel plate when the plate is placed at the proper position in the optical path. This type of displacement element is also mentioned in the aforementioned patent. When a telescope provided with either of these optical displacement devices is focused at infinity, the devices are without effect. This is ebcause the device lies in parallel light rays when the telescope is focused at infinity. According to the present invention, light diverging or light converging means are placed in the optical path in front of the optical displacement device so that the device is not in parallel rays of light when the telescope is focused at infinity. When the optical displacement device is adjusted, it then angularly deviates the line of sight instead of displacing the line of sight. When using the telescope for measuring angular deviations, according to the present invention, the telescope must always be focused at infinity. The telescope may, for example, be focused at a collimator and the angular deviations measured with respect thereto. Alternatively, the telescope may be used as an auto-collimator and directed against a plane mirror with the angular deviations being measured with respect to the direction normal to the plane mirror.

The above objects of the invention and the means for their attainment will be more fully understood after reading the following description taken in conjunction with the accompanying drawings in which:

Figure I is a view in elevation of an alignment telescope of the type shown in Patent #2,784,641 with an attachment, according to the present invention.

Figure II is a view in sectional elevation of the telescope shown in Figure I. The sectional view is taken along the center line of the telescope.

Figure III is a view in elevation of a jig transit provided with an attachment, according to the present invention.

Figure IV is a view in sectional elevation of the telescope of the jig transit shown in Figure III.

Figure V is a view in partal sectional side elevation taken along the line V—V of Figure III and looking in the direction of the arrows.

Figure VI is a view in sectional elevation taken along the line VI—VI of Figure V and looking in the direction of the arrows.

The alignment telescope shown in Figures I and II is completely described in Patent #2,784,641. The principal optical parts of this telescope include a first objective lens 2 and a second lens 8. First and second lenses 2 and 8 are located so that the second focal plane of the lens 2 and the first focal plane of the lens 8 coincide. Thus, parallel rays entering the lens 2 will emerge from the lens 8 as parallel rays. After passing through the lens 8 the light from an object passes through the displacement lens 14. The displacement lens 14 may be shifted in either of two mutually perpendicular directions by the optical micrometer devices provided. For example, the displacement lens 14 may be shifted laterally in the vertical direction by turning the knob 100. This in turn turns the pinion gear 84 which engages the rack 82 to slide the wedge 78 horizontally. The sliding of the wedge 78 under the mount 64 for the displacement lens 14 either raises or lowers the displacement lens. The light then passes through a second objective lens 16 (which in the following description and claims will be considered to be the main objective lens of the telescope) and a positive focusing lens 22 onto a reticle 28. The positive focusing lens 22 is shifted horizontally by means of the focusing knob 134 which turns the pinion gear 132 engaging the rack 130 attached to the draw tube 126 which carries the focusing lens 22. It is also possible, in certain telescopes, to use a negative focusing lens. An example of such a telescope will be described below. Other telescopes may not use a separate focusing lens at all but may be focused, for example, by moving the main objective lens. Any desired object along the optical line of sight may be imaged on the reticle 28 by these focusing means. Eyepiece 30 is provided for viewing the reticle 28. The individual lenses of the eyepiece are not shown in the drawing but any suitable eyepiece may be used. For example, a four lens erecting eyepiece made up of four plano convex lenses is commonly used in this type of telescope. An inverting eyepiece made up of two lenses could also be used.

When the alignment telescope as described so far is focused on any target closer than infinity, the line of sight can be brought into coincidence with an off-axis target by displacing the line of sight by means of the shifting lens 14 which can be operated by either the knob 100 in the vertical direction or the knob 118 in the horizontal direction. The amount of displacement necessary to bring the line of sight into coincidence with the target can be measured by means of the drums provided on the knobs 100 and 118. Thus the displacement of the target from a predetermined line of sight can be measured. The graduated drums attached to the knobs 100 and 118 may, for example, be graduated to read thousandths of an inch and have a range from 40 to 50 thousandths of an inch in both directions. If, on the other hand, the telescope is focused at infinity, as would be the case when looking into a collimator or when auto-collimation was being used, the displacement lens 14 would have no effect on the image focused on the reticle 28. The telescope as thus far described could then only be used to determine if the line of sight was coincident or parallel to the line of sight of a collimator into which the observer was looking. If auto-collimation was being used, the telescope would only indicate whether the mirror from which the auto-collimated image was being obtained was perpendicular to the line of sight of the telescope.

Now it has been found that by providing a weak lens 1 in the optical path in front of the displacement element 14, it is possible to use the same telescope for measuring small angular deviations. The presence of the weak lens 1 either converges or diverges the light striking the displacement element 14 when the telescope is focused at infinity so that the displacement element 14 does have an effect on the image focused on the reticle 28. However, since the telescope is focused at infinity, this effect is an angular effect rather than a displacement effect. By properly choosing the strength of the weak lens 1, it is possible to use the same micrometer drum attached to the knobs 100 and 118 as was used for the displacement measurements. For example, a drum which formerly measured thousandths of an inch may now measure seconds of arc. It can readily be shown that if F is the focal length of the weak lens 1, S is the unit of displacement measured by the drum and alpha ($\alpha$) is the unit of angular deviation to be measured by the drum when the weak lens 1 is in the optical path, the formula: $\tan \alpha = S/F$ should be satisfied. In the formula upward displacements of the line of sight and upward deviations of the line of sight from the telescope are considered positive. If the lens converges parallel rays, its focal length is considered positive and if it diverges parallel rays, its focal length is considered negative.

The weak lens 1 may be either a positive or a negative lens. In the embodiment shown, a negative lense is used. This is more readily adaptable to most telescopes of this type because such telescopes are designed to focus diverging rays. In order to focus diverging rays, the positive focusing lens 22 must be moved closer to the main objective 16. If, on the other hand, a positive lens 1 was used, the rays entering the objective 2 would be converging and the positive focusing lens 22 would have to be moved in the direction of the reticle.

In the particular telescope shown it would not be practical to move the positive focusing lens 22 closer to the reticle because of space limitations. However, a telescope could readily be designed in which there was more room between the focusing lens 22 and the reticle 28 when the telescope was normally focused for infinity. Then such a telescope could be re-focused to infinity when a weak positive lens was placed in front of the lens 2 instead of the weak negative lens 1 shown in the drawing. Such a telescope could be used in the normal manner for measuring displacements from the optical line of sight when the positive weak lens 1 was not in front of the lens 2. With the positive weak lens 1 placed in front of the lens 2, the telescope could then be used for measuring small angular deviations as in the case already described using a negative weak lens.

There is one disadvantage to using a negative lens as a weak lens in a construction such as shown in Figs. I and II. When a collimator or auto-collimating mirror is placed at a considerable distance from the telescope, the useful portion of the field of the telescope covered by the collimated image is quite small. With a negative lens 1 placed in front of the objective, the movement of the focusing lens 22 necessary to focus on infinity causes the magnification to be reduced. This reduces the useful portion of the field still more. It also tends to reduce pointing accuracy. On the other hand, when a positive lens 1 is used, the useful portion of the field is increased and so is pointing accuracy. In a construction of the type shown in Figures III, IV, V and VI, to be described below, the movement of the focusing lens does not vary the magnification as much as in the type of telescope so far described, so that the effect just described becomes less important.

As shown in Figures I and II, the weak lens 1 is adjustably mounted in a mount 302 by means of screws 304. The mount 302 is adapted to slide over the tube 42 of an alignment telescope and is slotted as at 306 and 308 so that it may be compressed by a strap 310 actuated by a knurled screw 312. The optical axis of the lens 1 may then be aligned with the optical axis of the telescope by means of the adjusting screws 304. When using the adjusting screws 304 the lens 1 slides on a shoulder provided in the mount 302. The spring 314 which is attached to the mount 302 by screws as shown holds the lens 1 against this shoulder.

If it is descired to make a telescope of the type shown in Figures I and II, which is only useful for measuring small angular deviations, this can be accomplished without the addition of another lens such as the weak negative lens 1. For example, this will be accomplised if the lenses 2 and 8 are mounted so that their focal planes do not perfectly coincide. The combination of the lenses 2 and 8 will then have a residual converging or diverging effect and parallel rays entering the lens 2 will emerge from the lens 8 either as converging or diverging rays. When such a telescope is focused at an object at infinity the displacement plate 14 will have the same effect on the image as for the embodiment shown in Figures I and II; i.e., the displacement lens 14 will angularly deviate the line of sight so that it may be brought into coincidence with the line of sight of a collimator.

Figures III, IV, V and VI illustrate the application of the present invention to the telescope of a jig transit. The jig transit shown in Figure III is similar to the jig transit shown and fully described in U.S. Patent #2,774,275 which was issued to Wm. G. Keller on December 18, 1956. As is known in the art, a jig transit includes a base 402 which is usually internally threaded so that it can be mounted on a tripod or other suitable stand means. A leveling head 404 is pivoted above the base 402 and is adjustable by means of the leveling screws 406. By means of the leveling screws 406 the spindle of the instrument can be adjusted to a truly vertical position so that the standards 408 can then be rotated about the vertical spindle as a vertical axis. Fine adjustment means 412 are provided for adjusting the standards 408 about the vertical axis and a level vial 414 is provided to indicate when the vertical spindle is actually vertical. The telescope 418 is mounted on a horizontal axis so that it may be pivoted between the standards 408. The level vial 416 mounted to the telescope by means of the posts 432 and 434 indicates when the line of sight o fthe telescope 418 is horizontal. A mirror 458 may be mounted on the horizontal axle carrying the telescope 418 and this mirror then serves the purposes described in U.S. Patent #2,774,275.

The telescope 418 includes an objective lens 422 (see Fig. IV), a negative focusing lens 421, and a reticle 423 which is adjustable by the screws 424. The negative focusing lens 421 is carried in a draw tube 425 which is adjustable by means of the knurled focusing knob 430 in order that any object may be focused on the reticle 423 by means of the combination of lenses 422 and 421. An eyepiece 426 is provided for viewing the image of an object superimposed on the reticle 423. The individual lenses of the eyepiece 426 are not specifically shown but may be of any conventional type. For example, a four lens erecting eyepiece consisting of four plano convex lenses can readily be used. A prism 428 is provided so that the telescope can be observed at a convenient angle to the line of sight. The telescope can normally be used with or without the prism 428.

It is also conventional to use a plano parallel tilting plate 502 in front of the objective of a telescope of the type described for a jig transit in order to displace the line of sight. The pional parallel plate 502 serves the same purpose in the telescope 418 as the shifting lens 14 does in the alignment telescope shown in Figures I and II. However, whereas the shifting lens 14 is shifted laterally in the alignment telescope, the tilting plate 502 must be tilted in the telescope shown in Figure IV. The tilting of the plano parallel plate 502 is accomplished by means of a knob 504 and a graduated drum 506 is attached to the knob 504 which is graduated to indicate the displacement of the line of sight. For example, the drum 506 may be graduated to read thousandths of an inch. The turning of the knob 504 turns the pinion gear 505 which engages a rack 507 sliding the rack 507 in a direction parallel to the axis of the telescope. The pin 509, which is secured to the mount for the plano parallel tilting plate 502, engages a slot in the rack 507 and is moved thereby to accomplish the tilting of the plano parrallel plate 502. The plano parallel plate 502 is pivoted about a horizontal axis perpendicular to the axis of the telescope but coplanar therewith. For example, the plano parallel plate 502 may be pivoted by two pins 511 which fit into the mount for the plano parallel glass plate 502.

According to the present invention, a weak lens 508 is mounted in front of the plano parallel tilting plate 502. The weak lens 508 is held in a mount 510 and is adjustable therein by means of screws 512. The weak lens 508 is held in the mount 510 by a spring washer 514 attached to the mount 510 by screws as shown. A short supporting tube 524 is attached to the mount 526 for the plano parallel tilting plate by threading it into the mount 526. The mount 510 slides over the supporting tube 524 and is slotted as shown at 516 and 518 of Figure III. A strap 520 passes around the mount 510 in order to compress it and hold it onto the supporting tube 524. A screw 522 is provided for tightening the strap 520.

In the embodiment of Figure IV the weak lens 508 is a positive lens and sufficient movement of the focusing lens 421 is provided in both directions so that the telescope can be focused at infinity with the weak lens 508 in position or the telescope can be focused at near objects when the weak lens 508 is removed. Incidentally, in this case, the focusing lens 421 is a negative lens so it must be moved toward the reticle to focus the telescope for near objects and away from the reticle to focus for rays converging into the objective lens 422. When the weak lens 508 is in place and the telescope is focused at infinity, the plano parallel tilting plate 502 will angularly deviate the line of sight through small angles. With the weak lens 508 not in place, the plano parallel tilting plate 502 displaces the line of sight when the telescope is focused at near objects in the conventional manner. The focal length of the weak lens 508 can be chosen so that the same scale on the drum 506 can be used for measuring either the displacements or the angular deviations. For example, this scale may read displacements in thousandths of an inch when the weak lens 508 is not in place and angular deviations in seconds of arc when the weak lens 508 is in place. As in the case of the embodiment previously described, if F is the focal length of the weak lens 508, S is the unit of displacement measured by the drum 506 and $\alpha$ is the unit of angular deviation in the same direction to be measured by the drum 506 when the weak lens is in the optical path, the formula: $\tan \alpha = -S/F$ should be satisfied. As shown by the formula, if a positive lens is used, F is positive, and the angular deviation is downward for the same direction of turning the knob 504 as would produce an upward displacement with the weak lens 508 removed.

Having thus described the invention, what is claimed is:

1. In a telescope provided with a variable optical displacement element located along its optical path at a position so that it will intercept parallel rays from an object when the telescope is focused at infinity, said variable optical displacement element being for the purpose of displacing the line of sight of the telescope from an object when the telescope is focused on objects nearer than infinity, said telescope also being provided with means for moving said variable optical displacement element and means for measuring the movement of said optical displacement element, said latter means indicating the displacement of the line of sight, which for any setting of said variable means is constant for any object distance up to infinity; an attachment which converts said telescope to an instrument for measuring angles when said telescope is focused at infinity comprising a relatively weak lens, having an equivalent focal length F, which may be inserted in the optical path of said telescope forwardly of said optical displacement element at a position to deviate the rays passing through said variable optical displacement element so these rays are not parallel when the telescope is focused at infinity, the focal length, F, of said relatively weak lens being chosen so that the same measuring means used for indicating variable displacements may also be used for indicating the variable angular deviations when the attachment is inserted in the optical path, said variable angular displacements, $\alpha$, being related to said variable displacements S by the formula: $\tan \alpha = -S/F$.

2. In a telescope provided with a variable optical displacement element located along its optical path at a position where it would intercept parallel rays from an object when the telescope is focused at infinity so that said variable optical displacement element would displace the line of sight of the telescope from an object when the telescope is focused on objects nearer than infinity, said telescope also being provided with means for moving said variable optical displacement element and means for measuring the movement of said optical displacement element which would indicate the displacement of the line of sight; a relatively weak lens, having an equivalent focal length F, inserted in the optical path of said telescope forwardly of said optical displacement element at a position to deviate the rays passing through said variable optical displacement element so these rays are not parallel when the telescope is focused at infinity, the focal length, F, of said relatively weak lens being chosen so that the measuring means which would be used for indicating variable displacements may be used for indicating variable angular deviations, said variable angular deviations, $\alpha$, being related to said variable displacements S by the formula: $\tan \alpha = -S/F$.

3. In a telescope provided with a variable optical displacement element located along its optical path at a position where it would intercept parallel rays from an object when the telescope is focused at infinity so that said variable optical displacement element would displace the line of sight of the telescope from an object when the telescope is focused on objects nearer than infinity, said telescope also being provided with means for moving said variable optical displacement element and means for measuring the movement of said optical displacement element which would indicate the displacement of the line of sight; a lens arrangement, having an equivalent focal length F, inserted in the optical path of said telescope forwardly of said optical displacement element at a position to deviate by a relatively small amount the rays passing through said variable optical displacement element so that these rays are not parallel when the telescope is focused at infinity, the focal length, F, of said lens arrangement being chosen so that the measuring means which would be used for indicating variable displacements may be used for indicating variable angular deviations, said variable angular deviations, $\alpha$, being related to said variable displacements S by the formula: $\tan \alpha = -S/F$.

4. In a telescope provided with a variable optical displacement element located along its optical path at a position where it would intercept parallel rays from an object when the telescope is focused at infinity so that said variable optical displacement element would displace the line of sight of the telescope from an object when the telescope is focused on objects nearer than infinity, said telescope also being provided with means for moving said variable optical displacement element and means for measuring the movement of said optical displacement element which would indicate the displacement of the line of sight; a lens arrangement, consisting essentially of a first lens and a second lens spaced from said first lens at a distance so that its first principal focal plane will not quite coincide with the second principal focal plane of the first lens, said lens arrangement having an equivalent focal length F, inserted in the optical path of said telescope forwardly of said optical displacement element at a position to deviate by a relatively small amount the rays passing through said variable optical displacement element so that these rays are not parallel when the telescope is focused at infinity, the focal length, F, of said lens arrangement being chosen so that the measuring means which would be used for indicating variable displacements may be used for indicating variable angular deviations, said variable angular deviations, $\alpha$, being related to said variable displacements S by the formula: $\tan \alpha = -S/F$.

References Cited in the file of this patent

UNITED STATES PATENTS

| | | |
|---|---|---|
| 2,424,257 | Sherman | July 22, 1947 |
| 2,588,974 | Fontaine | Mar. 11, 1952 |
| 2,682,804 | Clifford et al. | July 6, 1954 |
| 2,784,641 | Keuffel et al. | Mar. 12, 1957 |

FOREIGN PATENTS

| | | |
|---|---|---|
| 317,429 | Germany | Dec. 17, 1919 |
| 340,836 | Germany | Sept. 19, 1921 |
| 810,976 | France | Jan. 9, 1937 |
| 749,690 | Great Britain | May 30, 1956 |